(12) United States Patent
Yin et al.

(10) Patent No.: US 7,813,485 B2
(45) Date of Patent: Oct. 12, 2010

(54) SYSTEM AND METHOD FOR SEAMLESSLY INTEGRATING AN INTERACTIVE VISUAL MENU WITH AN VOICE MENU PROVIDED IN AN INTERACTIVE VOICE RESPONSE SYSTEM

(75) Inventors: Min Yin, Sunnyvale, CA (US); Shumin Zhai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/139,882

(22) Filed: May 26, 2005

(65) Prior Publication Data

US 2006/0285662 A1 Dec. 21, 2006

(51) Int. Cl.
*H04M 11/00* (2006.01)

(52) U.S. Cl. .............. 379/88.13; 348/14.04; 348/14.07; 379/88.01; 379/88.02; 379/88.03; 379/88.04; 379/88.17; 379/88.18; 709/203; 709/205; 709/231; 709/232; 709/237; 725/51; 725/52

(58) Field of Classification Search ... 379/88.01–88.04, 379/88.17–88.18, 88.13; 455/414.4; 715/716–717, 715/728; 348/14.04, 14.07; 370/351–356; 709/203, 205, 231, 232, 237; 725/51, 52, 725/54

See application file for complete search history.

(56) References Cited

U.S. PATENT DOCUMENTS

| | | | |
|---|---|---|---|
| 5,737,393 A | | 4/1998 | Wolf |
| 5,802,526 A | * | 9/1998 | Fawcett et al. ........... 707/104.1 |
| 5,890,122 A | * | 3/1999 | Van Kleeck et al. ......... 704/275 |
| 5,892,813 A | * | 4/1999 | Morin et al. .............. 379/88.01 |
| 6,006,266 A | * | 12/1999 | Murphy et al. .............. 709/227 |
| 6,091,805 A | * | 7/2000 | Watson ..................... 379/93.17 |
| 6,456,699 B1 | * | 9/2002 | Burg et al. ................ 379/88.17 |
| 6,717,593 B1 | * | 4/2004 | Jennings ..................... 715/760 |
| 6,885,737 B1 | * | 4/2005 | Gao et al. ................ 379/93.17 |
| 6,983,307 B2 | * | 1/2006 | Mumick et al. ............. 709/205 |
| 7,054,421 B2 | * | 5/2006 | Kandlur et al. .......... 379/93.15 |
| 7,080,315 B1 | * | 7/2006 | Lucas et al. .................. 715/201 |
| 7,136,478 B1 | * | 11/2006 | Brand et al. ........... 379/265.09 |
| 2003/0002635 A1 | * | 1/2003 | Koch et al. ............... 379/88.17 |
| 2003/0005076 A1 | * | 1/2003 | Koch et al. ................... 709/217 |
| 2003/0046316 A1 | * | 3/2003 | Gergic et al. ................. 707/513 |
| 2003/0071833 A1 | * | 4/2003 | Dantzig et al. .............. 345/700 |
| 2003/0162561 A1 | * | 8/2003 | Johnson et al. ............. 455/553 |
| 2004/0117804 A1 | * | 6/2004 | Scahill et al. ............... 719/320 |
| 2004/0120479 A1 | | 6/2004 | Creamer et al. |
| 2006/0203977 A1 | * | 9/2006 | Erhart et al. ............. 379/88.13 |
| 2007/0135101 A1 | * | 6/2007 | Ramati et al. ............ 455/414.1 |

\* cited by examiner

*Primary Examiner*—Hemant Patel
(74) *Attorney, Agent, or Firm*—Samuel Kassatly; Shimokaji & Assoc.

(57) ABSTRACT

An interactive visual menu system seamlessly integrates an interactive visual menu with an audio menu provided in an interactive voice response system. The system augments a voice menu by displaying the content of the voice menu to a caller. The system assumes that the caller is placing a call near an interactive device such as a computer and the user is logged onto the interactive device using, for example, instant messaging. The system "pushes" a graphical menu through the Internet onto the interactive device. Display of the graphical menu is synchronized with the audio menu. The caller selects the desired choices either by pressing the phone keypad or by clicking on graphical menus on the interactive device; both voice and visual information are updated accordingly.

20 Claims, 7 Drawing Sheets

SYSTEM AND METHOD FOR SEAMLESSLY INTEGRATING AN INTERACTIVE VISUAL MENU WITH AN VOICE MENU PROVIDED IN AN INTERACTIVE VOICE RESPONSE SYSTEM

FIELD OF THE INVENTION

The present invention generally relates to interactive voice response systems such as audio telephone menus. In particular, the present system pertains to a visual menu provided to an interactive device in synchronization with an audio menu.

BACKGROUND OF THE INVENTION

Virtually all major corporations, financial institutions, technical support centers, hospitals, airlines, call centers, and government agencies route telephone inquiries to appropriate human agents through automated interactive voice response systems. Although widely used, the problems of dealing with interactive voice response systems can be felt intuitively first hand and are also widely recognized in the research literature of human-computer interaction. The populace often calls these problems the "touchtone hell".

In research, it is well known that the current generation of telephone interfaces is frustrating to use, in part because callers have to wait through the recitation of long prompts in order to find the options that interest them. Researchers have long studied how to better design the voice menu to ease the frustrations experienced by callers and have proposed various voice menu design guidelines. For example, some have suggested that long touchtone menus route the caller more efficiently than short menus, since long menus reduce the number of menu layers to navigate.

In contrast, another suggested method of easing the limitations of auditory menus is to employ shorter menus with greater depth in the hierarchy. Inspired by humans' ability to shift their gaze in order to skip uninteresting items and scan through large pieces of text, alternative touchtone interface styles in which callers issue explicit commands to accomplish skipping actions have also been proposed.

Despite the efforts of researchers, the same voice-menu based interactive voice response systems remain the state of the art. The difficulty of navigating voice menus is fundamentally rooted in the nature of auditory information. Visual and auditory stimuli have fundamentally different characteristics. Unlike graphical and textual menus, voice menus are sequential at a fixed pace, either too fast (when the information is critical) or too slow (when the information is uninteresting) to the caller. A long voice menu is frustrating to the caller since it requires the caller to memorize many choices to compare and select the most reasonable one.

On the other hand, short voice menus comprising broad categories can also be difficult because the caller is often unsure which category leads to the desired end. It is often difficult for a caller to determine if a particular category of functions suits their need until items at a lower level of the hierarchical menu are heard. If the caller is impatient and fails to catch, or forgets, a particular choice, he or she often has to start all over.

In comparison to process visual menus, voice menus impose greater cognitive burden on the user. To navigate interactive voice response systems, the caller has to understand the words and maintain them in memory leaving less processing ability of the brain to search for the best choice matching the goal the user has in mind.

In contrast, if a graphical menu is available, a caller can visually scan and select from a menu visually displayed with text at a pace set by the caller. A caller can scan and compare items on the menu without having to commit the items to memory. With a visual menu, a caller can also more easily jump between different levels of a visual hierarchical menu structure.

Clearly, it is potentially advantageous for interactive voice response systems to visually display a voice menu on a screen to the caller. One conventional approach to visual display of a voice menu displays the text of the voice menu onto a screen built into a phone set. This approach requires specially designed phone set and it significantly complicates the communication mechanisms and protocols between the interactive voice response system and the telephone handset. It requires advanced telephone sets instrumented with large screens and CPUs to handle the visualized display of voice menus.

Another approach is to use a computer to display the visual content of a voice menu. The difficulty with this approach has been the requirement of a direct physical connection between the phone set, the local computer as well as their coordination with the telephone network and the interactive voice response (IVR) systems. Reference is made for example to U.S. Pat. No. 6,091,805.

Conventional methods further require changing or enhancing the protocols and functions of the widely deployed phone switching circuits and interactive voice response systems so that both voice and text data can be simultaneously transmitted to the same telephone set. The cost of upgrades on both the phone sets and the infrastructure presents a difficult challenge to these conventional methods.

What is therefore needed is a system, a computer program product, and an associated method for seamlessly integrating an interactive visual menu with an audio menu provided in an interactive voice response system without imposing complicated hardware, circuits, or communication mechanism changes. The need for such a solution has heretofore remained unsatisfied.

SUMMARY OF THE INVENTION

The present invention satisfies this need, and presents a system, a computer program product, and an associated method (collectively referred to herein as "the system" or "the present system") for seamlessly integrating an interactive visual menu on a computer display with an audio menu provided in an interactive voice response system. The present system augments a voice menu by displaying the content of the voice menu on the user's computer through Internet-based backend integration. The present system assumes that a user or a caller is placing a call near an interactive device such as, for example, a computer and the user is logged onto the computer using, for example, instant messaging.

The present system "pushes" a graphical menu through the Internet onto the computer that has been logged onto. The present system uses, for example, a default instant messaging client, a web browser, a customized instant messaging client, or a standalone program, to display the graphical menu. Upon receiving a call from the user, the present invention enables the interactive voice response (IVR) system to deliver a visual and text channel of information to the user based on a user ID centered routing mechanism. The present system synchronizes display of the graphical menu with the audio menu from the interactive voice response system.

The present system pinpoints a virtual location of the user instead of his or her physical location. The integration of the graphical menu and the audio menu can be managed from network-based servers and services on the Internet with no direct connection required among devices local to a caller such as the phone, where the audio signal is delivered, and the computer, where the visual message is delivered. With this Internet-based cross-device and cross-modality coordination, the visual information is integrated with the voice call at the user's activity level, allowing a multi-modal interaction experience by using resources available to the caller. The caller selects the desired choices either by pressing the phone keypad or by clicking on the graphical menus on the computer screen; both voice and visual information are updated accordingly.

A user places a phone call to a company utilizing the present system. The company identifies the user by the caller ID, customer service number or other means. From an ID mapping database, the present system associates the user with the user's ID of, for example, instant messaging. The present system contacts the user by transmitting a message to an interactive display associated with the user. For example, the present system sends the user an instant message with an embedded hyperlink. The user selects the hyperlink, connecting the user with a server comprising the present system. The present system then provides a visual menu to the user on the interactive display associated with the user. The user can respond to the menu by clicking on the choices on the graphical menu with an input device, pressing keys on a keyboard associated with the interactive display or pressing keys on a keypad on the telephone the user makes the call.

Study shows on average with the present system, the participants were approximately 36% faster in navigating phone trees with about 75% fewer errors than without the present system. Using the present system, the participants made their selections clearly ahead of the voice menu at least 60% of the time. Due to the advantage of fast and self-paced visual scanning, the relative location of the correct choice on a list in a menu provided by the present system mattered little to a user. Without the present system, the location of an item in the audio list was a major determinant to completion time.

The present system enables potential functionality that may seamlessly merge human agent support with web-based support. In one embodiment, a visual menu of the present system comprises a search box that allows a user to type in a query that returns a list of selectable phone tree terminal nodes. In another embodiment, the visual menu of the present system is embedded with hyperlinks to a "frequently asked questions" web page. The "frequently asked questions" web page can further be customized according to a profile or history records of a caller. In yet another embodiment, the visual menu will display the history of the keypad selection and several recently used menu item shortcuts.

In one embodiment, information augmenting an audio or visual menu may be displayed to a caller according to the responses of the caller. In some cases, the caller may be able to obtain enough information by interacting with the present system before speaking to a human agent of a company, saving time and cost for both the customer and the company.

In yet another embodiment, a user can start an interaction with a company on the web and end up talking to a human agent. Taking travel reservation as an example, if a user has trouble completing a reservation online, a button click on a visual menu can initiate contact with a human travel agent. The human agent has available the interaction context and history the user has already created and can help complete the travel reservation. Conversely, the human travel agent can use a further embodiment of the present system to push a visual display of a tentative itinerary onto the screen of the user for review. In contrast, conventional approaches to travel reservation over the phone require a human agent to read the itinerary to the user, forcing the user to frantically jot down the information. This embodiment further takes advantage of the specific temporal and spatial characteristics of different modalities of information.

The present system utilizes "user ID centered" integration using user ID mapping. The present system does not require knowledge of a physical location of the user. Rather, the present system delivers information through additional channels to the same person because different interaction devices are associated with the same person by user ID mapping. Due to the decreasingly perceptible Internet latency, these additional channels of output (i.e., voice/speech and visual/textual) can function in concert. The present system can further accept user input from all modalities (key presses, mouse clicks, or verbal inquiries). Because of the tight synchronization between the phone (voice and keypad entry) and the computer screen display, the present system achieves Internet and user ID-based "device aggregation" at the user's activity level.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 comprises FIGS. 3A and 3B and represents a process flow chart illustrating a method of operation of the interactive visual menu of FIGS. 1 and 2 in initializing an interactive visual menu session;

DETAILED DESCRIPTION OF PREFERRED EMBODIMENTS

The following definitions and explanations provide background information pertaining to the technical field of the present invention, and are intended to facilitate the understanding of the present invention without limiting its scope:

Instant Messaging: A computer-based conference using text or other medium over the Internet between two or more people. Instant messaging (IM) is not a dial-up system like the telephone; it requires that all parties be on-line at the same time.

Internet: A collection of interconnected public and private computer networks that are linked together with routers by a set of standards protocols to form a global, distributed network.

Figure 1:
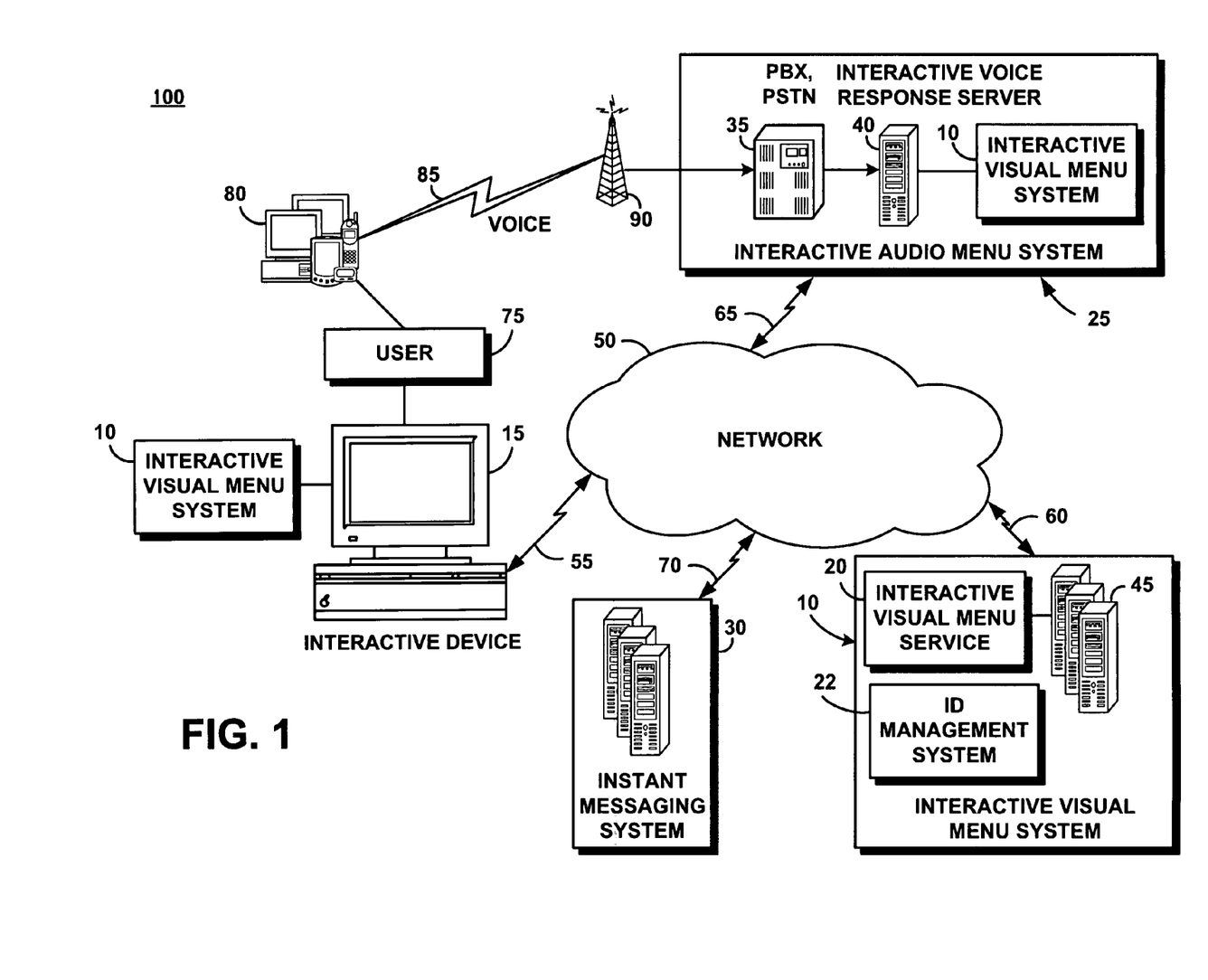
FIG. 1 is a schematic illustration of an exemplary operating environment in which an interactive visual menu system of the present invention can be used.

FIG. 1 portrays an exemplary overall audio-visual menu system 100 in which a system, a service, a computer program product, and an associated method for seamlessly integrating an interactive visual menu with an audio menu provided in an interactive voice response system (the interactive visual menu system 10 or the "system 10") according to the present invention may be used. System 10 comprises a software programming code or a computer program product that is typically embedded within, or installed on a computer, workstation, laptop, PDA or other wireless handheld device, cell phones, etc., as represented by an interactive device 15. Alternatively, system 10 can be saved on a suitable storage medium such as a diskette, a CD, a hard drive, or like devices.

The audio-visual menu system 100 comprises an interactive visual menu system 10, an interactive audio menu system 25, and an instant messaging system 30. While system 10 is described for illustration purpose only in terms of the instant messaging system 30, it should be clear that the invention is applicable as well to, for example, any method by which a user may be contacted on the interactive device 15 while the user is conducting a phone call.

The interactive audio menu system 25 uses a method for allowing a user to contact, for example, a service or a company, as represented by system 25 through, for example, a Private Branch Exchange (PBX) or the Public Switched Telephone Network (PSTN) 35. PBX or PSTN 35 is further connected to an Interactive Voice Response server 40 that comprises system 10. The Interactive Voice Response server 40 may also be a server cluster. The interactive visual menu system 10 comprises a server cluster 45 that comprises system 20. The server cluster 45 may also be a server.

The interactive device 15, the interactive visual menu system 10, the interactive audio menu system 25, and the instant messaging system 30 communicate by means of a network 50 via communications links 55, 60, 65, 70, respectively. While system 10 is described in terms of network 50, the interactive device 15, the interactive visual menu service 20, the interactive audio menu system 25, and the instant messaging system 30 may communicate locally and/or remotely.

A user 75 uses a telephone 80 to contact, for example, a service or a company, as represented by the interactive audio menu system 25. Telephone 80 may be a wireless device as illustrated in FIG. 1, a wired device, or a software phone running inside a computer. Telephone 80 does not require any modification to operate with system 10. As illustrated in FIG. 1, a message initiated by user 75 is transmitted, for example, via voice transmission 85 through an antenna 90 to PBX, PSTN 35.

Figure 2:
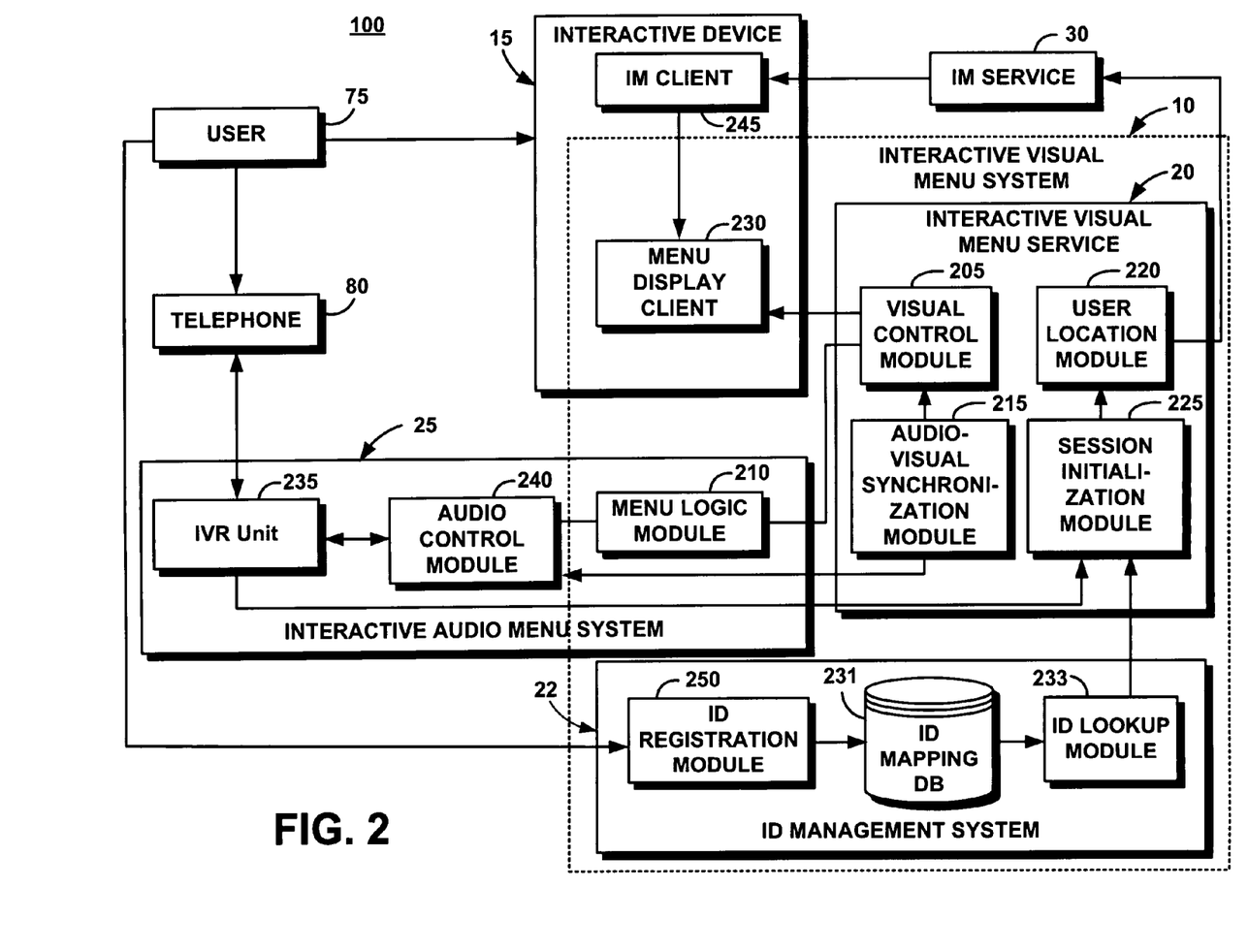
FIG. 2 is a block diagram of the high-level architecture of the interactive visual menu system of FIG. 1 illustrating session initialization.

FIG. 2 illustrates an exemplary high-level hierarchy of system 10 illustrating operation of system 10 during session initialization in which a visual channel is opened for transmitting a visual menu to user 75 on the interactive device 15. The visual menu augments an audio menu provided to user 75 over telephone 80.

System 10 comprises a menu logic module 210 on the interactive audio menu system 25. System 10 further comprises an audio-visual synchronization module 215, a visual control module 205, a user location module 220, and a session initialization module 225 on the interactive visual menu service 20, and an ID mapping database (dB) 231, an ID registration module 250, and an ID lookup module 233 on ID management system 22. System 10 comprises a menu display client on the interactive device 15. The interactive audio menu system 25 further comprises an interactive voice response (IVR) unit 235 and an audio control module 240.

The visual control module 205 and the audio control module 240 share menu logic of menu logic module 210. The menu logic module 210 comprises a set of VoiceXML files and a set of HTML files. The set of VoiceXML files defines a voice menu, as it does in the majority of conventional IVR systems. The visual menu corresponding to the audio menu is stored in one or more HTML files, whose file names anchored to the appropriate position in the VoiceXML file with a special tag interpreted by the visual control module 205. The audio control module 240 and the IVR unit 235 ignore the tag.

Conventional IVR systems can easily be upgraded to comprise system 10 without completely rewriting existing voice menus. Furthermore, system 10 is backward compatible. The audio-visual menu system 100 can, without any modification, deliver a voice menu to telephone 80 and user 75 when user 75 is not logged on to the interactive device 15 or a messaging service such as IM service 30.

Prior to use of system 10 by user 75, user 75 registers a user ID and a unique virtual address of the user 75 through ID registration module 250. The user ID may be, for example, a phone number, an employee ID, a customer ID, any other unique identification, or a combination of them. The ID mapping dB 231 maps the user ID to the unique virtual address of the user 75. An exemplary unique virtual address of the user 75 is an IM address or a SIP address of the user 75. The IM address of the user 75 provides a location of the user as opposed to a location of the interactive device 15. By using a unique virtual address for contacting the user, the user can, for example, log onto the IM service 30 from any interactive device such as interactive device 15 and view a visual menu transmitted to the interactive device 15 that corresponds to and is synchronized with an audio menu transmitted to telephone 80.

User 75 can be registered for one or more entities or clients that utilize the audio-visual menu system 100. Each audio-visual menu system 100 can comprise the ID mapping dB 231 that maps a user ID to a virtual address for that specific system. Otherwise, a centralized directory service can manage ID mapping for more than one audio-visual menu system 100. Associated with each virtual address can be additional caller identifications, such as, for example, a cell phone number, an office phone number, and a home phone number.

Figure 3A:
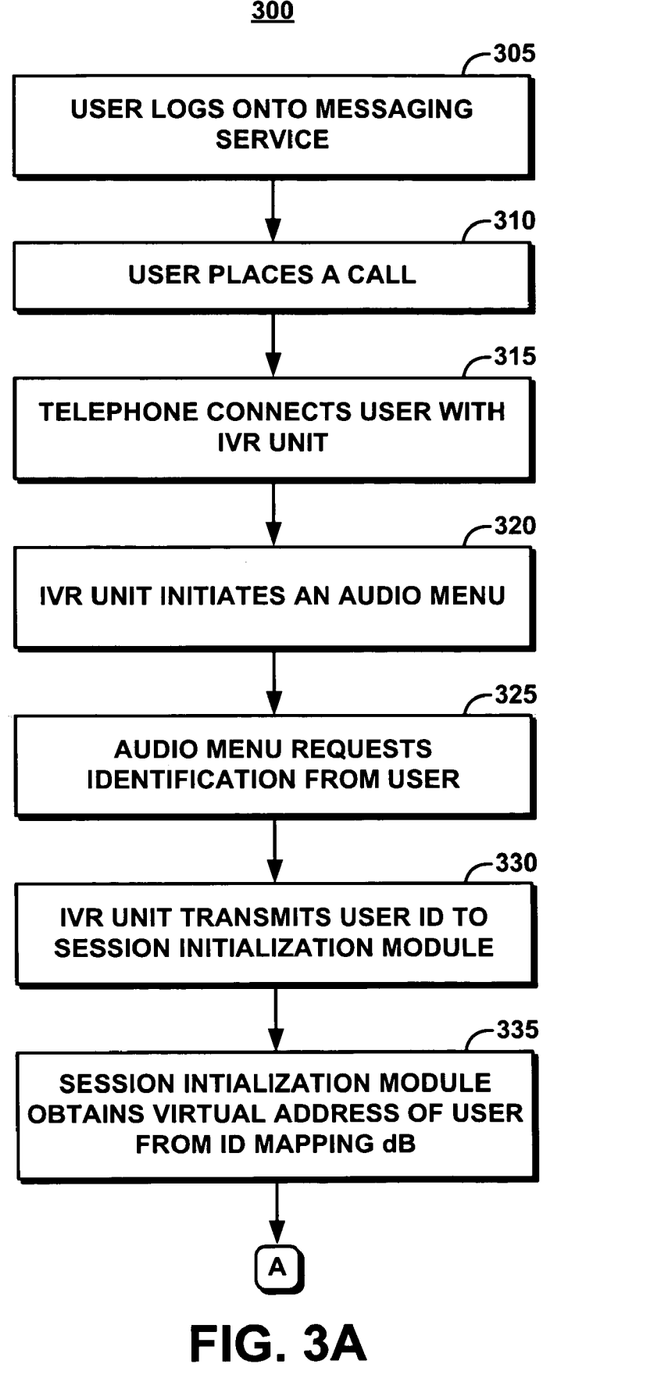
Figure 3B:
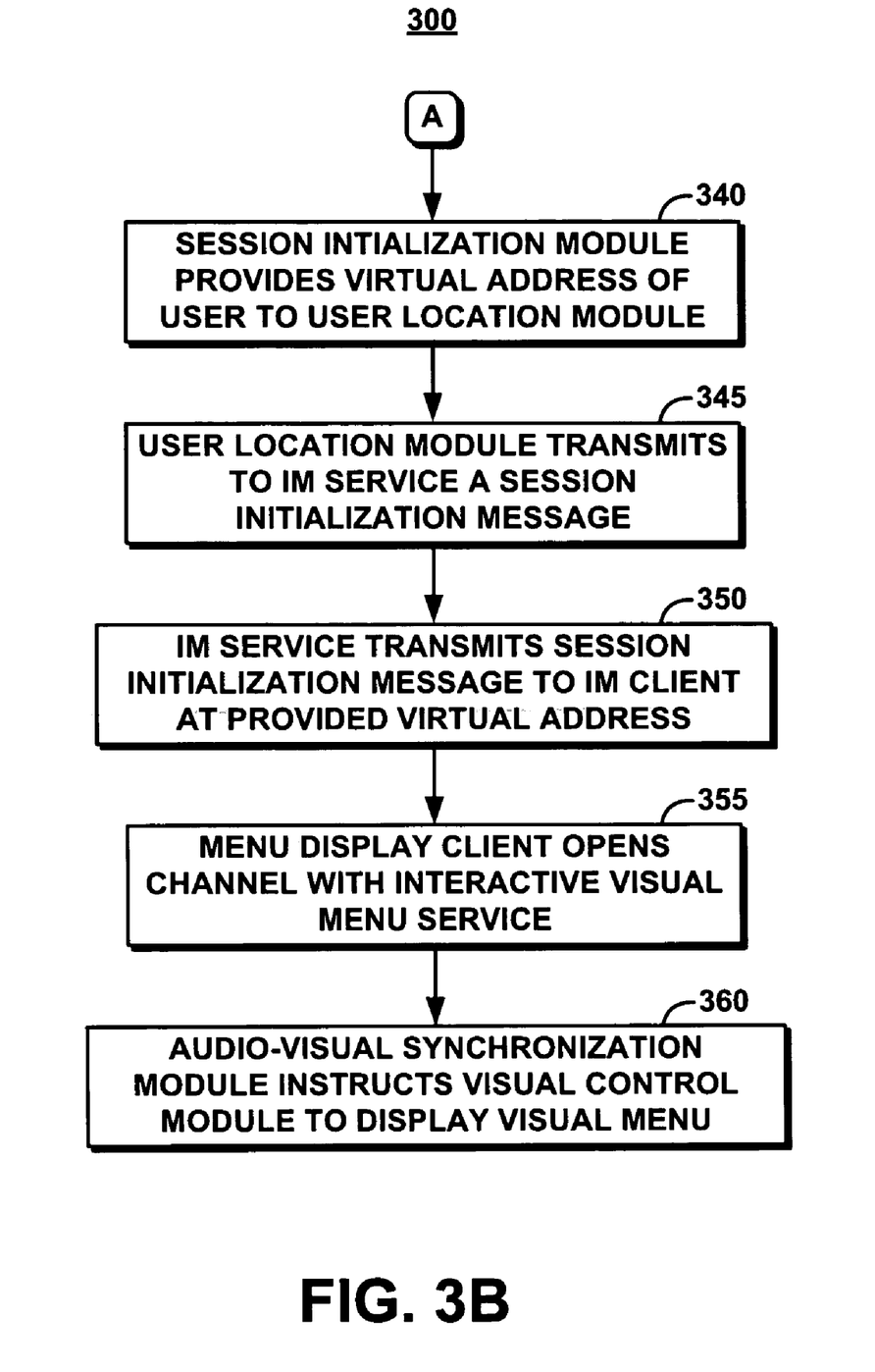

FIG. 3 (FIGS. 3A, 3B) illustrates a method 300 of system 10 in initializing an interactive visual menu session with user 75. User 75 logs onto a messaging service such as, for example, instant messaging (IM) (step 305). User 75 places a call to an entity or client such as a company, a business, a hospital, etc., using telephone 80 (step 310). Telephone 80 connects user 75 with the IVR unit 235 (step 315). The IVR unit 235 initiates an audio menu using the audio control module 240 (step 320). The audio menu requests identification from user 75 (step 325), for example, a user ID. Some identification, such as caller ID, can also be obtained automatically without user attention. User 75 provides identification that the IVR unit 235 transmits to the session initialization module 225 (step 330).

The session initialization module 225 accesses the ID mapping dB 231 through ID lookup module 233 to obtain a virtual address associated with user 75 (step 335). The ID mapping dB 231 may comprise a mapping from one virtual address to many IDs for user 75. The session initialization module 225 authenticates user 75 and provides the virtual address to the user location module 220 (step 340). The user location module 220 transmits a session initiation message along with the virtual address to, for example, IM service 30 (step 345).

Any service may be used that can send a message to a virtual address for user 75. The IM service 30 transmits the session initiation message to the IM client 245 according to the virtual address for user 75 (step 350). The IM client 245 handles the session initiation message sent by the user location module 220 through the IM service 30. The IM client 245 comprises, for example, a standard IM client such as, for example, AIM (AOL Instant Messenger), YAHOO™ Messenger, or IBM Sametime™, a plug-in to the standard IM client, or a dedicated software code to handle session initiation by system 10.

The session initiation message comprises information that allows the menu display client 230 to open a visual channel such as, for example, a web browser or a customized IM client. The session initiation message comprises a session identifier that uniquely represents the interactive visual menu session (further referenced herein as a call session), allowing further synchronization between the audio menu and the visual menu. The session initiation message further comprises information such as an IP address, port number, or URL of the interactive visual menu service 20. The menu display client 230 contacts the interactive visual menu service 20 (step 355), opening a channel specifically for the interactive visual menu session between the menu display client 230 and the visual control module 205 of the interactive visual menu service 20. The audio-visual synchronization module 215 instructs the visual control module 205 to display the visual menu to user 75 via the menu display client 230 (step 360) and a graphical window on interactive device 15.

Figure 4:
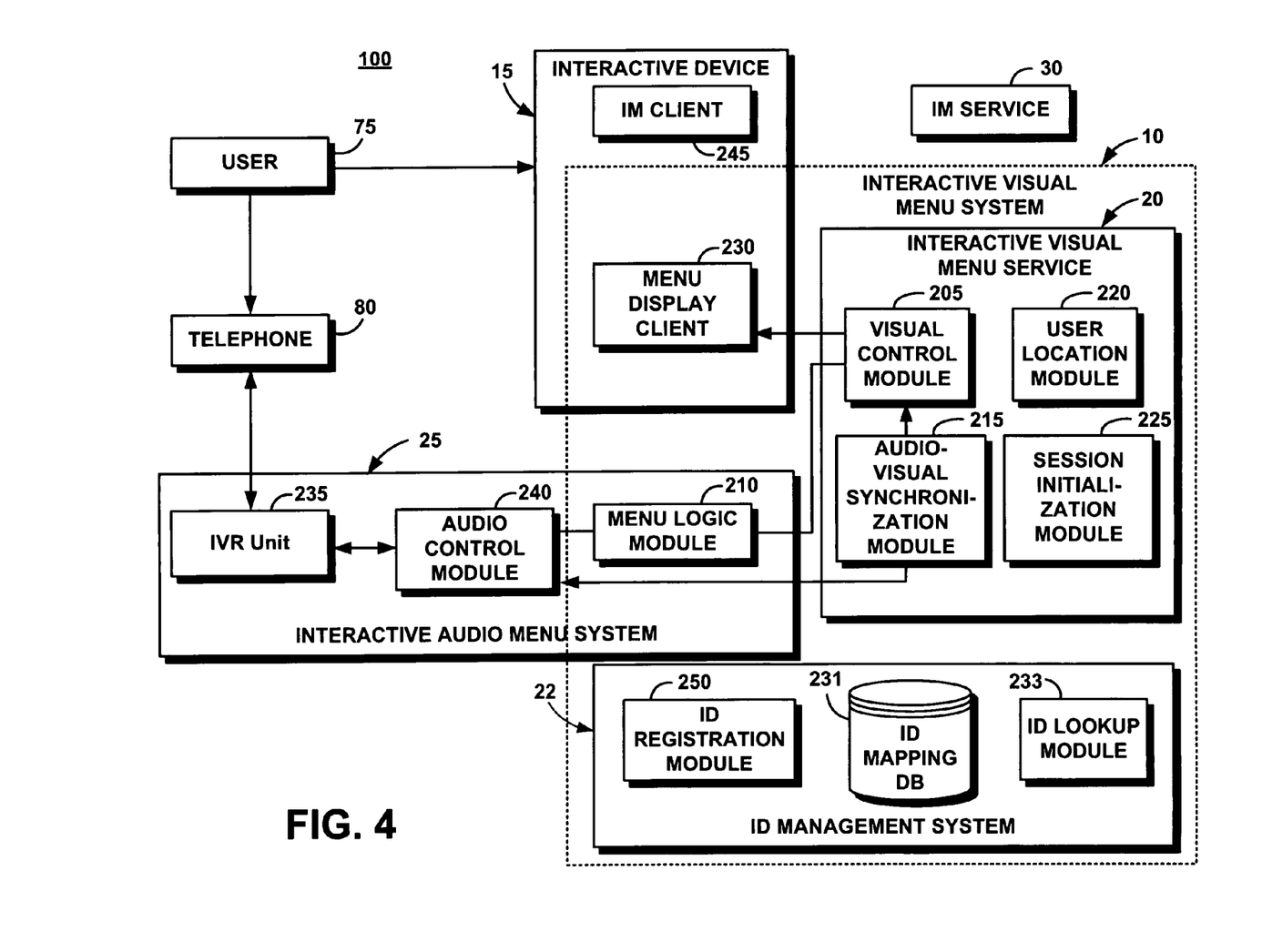
FIG. 4 is a block diagram of the high-level architecture of the interactive visual menu system of FIG. 1 illustrating menu display and synchronization.

FIG. 4 illustrates an exemplary high-level hierarchy of system 10 illustrating operation of system 10 while a user is interacting with either the audio menu (by, for example, pressing keypads on a telephone) or the visual menu (by, for example, pressing keys on a keyboard or using a mouse associated with the interactive device 15).

Figure 5:
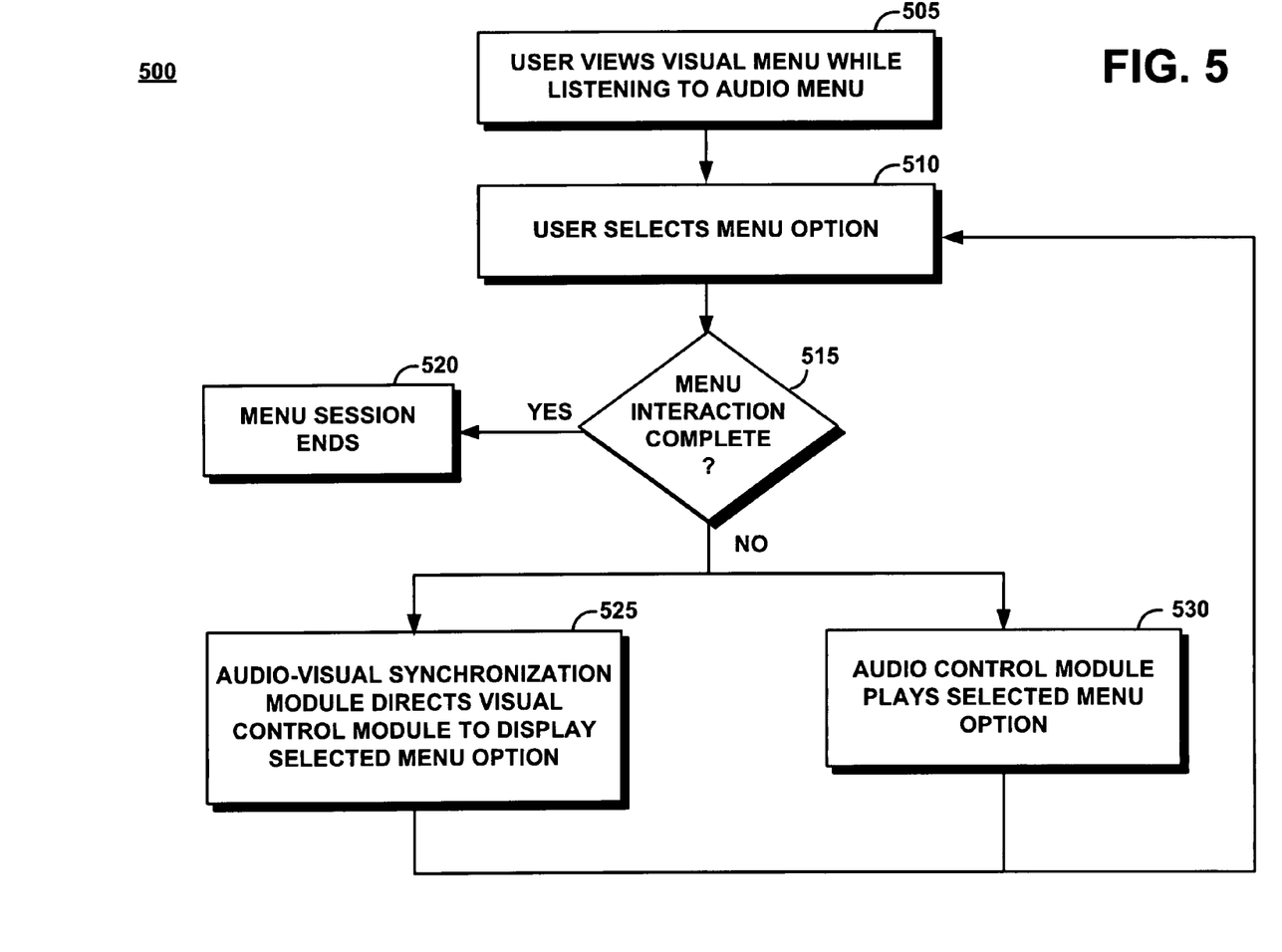
FIG. 5 is a process flow chart illustrating a method of operation of the interactive visual menu system of FIGS. 1 and 3 in providing to a user a visual menu synchronized with an audio menu.

With further reference to FIG. 4, FIG. 5 illustrates a method 500 of operation of system 10 in transmitting a visual menu to user 75 that is synchronized with the audio menu. User 75 views a visual menu while listening to a corresponding audio menu (step 505). The user selects a menu option (step 510) by selecting a keypad on telephone 80 or a key on a keyboard associated with interactive device 15. The selection made by user 75 may have ended the interactive menu session by, for example, connecting user 75 to a human agent, by exiting the menu, or by hanging up. If so, the menu interaction is complete (decision step 515) and the interactive menu session ends (step 520).

If the menu interaction is not complete (decision step 515), the audio-visual synchronization module 215 directs the visual control module 205 to display the selected menu option (step 525) and renew the display screen. The visual menu is then dynamically updated in response to the phone key presses or input via the graphical interface. Concurrently, the audio control module 240 plays the selected menu option (step 530), transmitting audio prompts to user 75 through the IVR unit 235.

The audio-visual synchronization module synchronizes the visual control module 205 and the audio control module 240 using, for example, the time stamp and DTMF (dual-tone multi-frequency) input from telephone 80 or other input user made through Interactive device 15. When user 75 keys in a menu choice on the keypad of telephone 80, the key value is sent to the audio control module 240 and to the audio-visual synchronization module 215. In response to direction from the audio-visual synchronization module 215, the visual control module 205 transmits an updated visual menu to the interactive device 15. In response to direction by the IVR unit 235, the audio control module 240 plays the selected audio prompt.

When user 75 selects menu choice through keyboard, mouse click, or other interactive methods associated with interactive device 15, the selected choice is sent to the Interactive device 15 and to the audio-visual synchronization module 215. In response to user input, the interactive device 15 updates the visual menu displayed to the user. In response to direction from the audio-visual synchronization module 215, the audio control module 240 directs the IVR unit 235 to play the selected audio prompt.

System 10 allows flexible visual display schemas. The menu display client 230 displays the visual content of the voice menu sent by the visual control module 205 from the interactive visual menu service 20. The visual menu content can be presented in a variety of ways such as, for example, through a standard IM client, a web browser, or a customized IM client.

Using a standard IM client 245, system 10 sends the text content of a visual menu through the regular IM protocol and displays the visual menu within an IM client window. This approach requires no software installation in the interactive device 15.

Using a web browser, the visual control module 205 hosts the visual content of the voice menu as a web service from the interactive visual menu service 20. System 10 sends to the interactive device 15 a URL pointed to that web service at the session initiation stage. The URL is transmitted to the interactive device 15 through the IM service 30. A web browser is spawned on the interactive device 15 to display the visual menu content. This method does not require any installation at the interactive device 15. HTTP protocol used by this approach can handle much richer media than an IM message. Furthermore, the audio menu can be augmented with additional information that can be easily integrated and presented through a web browser. A browser adapter capable of accepting requests from the audio-visual synchronization module 215 can be used to synchronize the visual and audio menus. This browser adapter pulls a new page automatically to synchronize the visual menu with the audio menu.

A customized IM client 245 accepts the session initiation message sent by the interactive visual menu service 20 through standard IM protocol and opens a dedicated TCP/IP socket connection between the interactive device 15 and the interactive visual menu service 20. System 10 opens a dedicated TCP/IP socket connection for each call session to exchange visual content and control instructions such as updates by user 75. Using a customized IM client 245 allows system 10 to closely control communication and synchronization. The customized IM client 245 further allows a flexible graphical user interface design. Although the customized IM client 245 requires user installation, the customized IM client 245 can be deployed as a plug-in of the standard IM client 245 to make installation and distribution easier.

Figure 6:
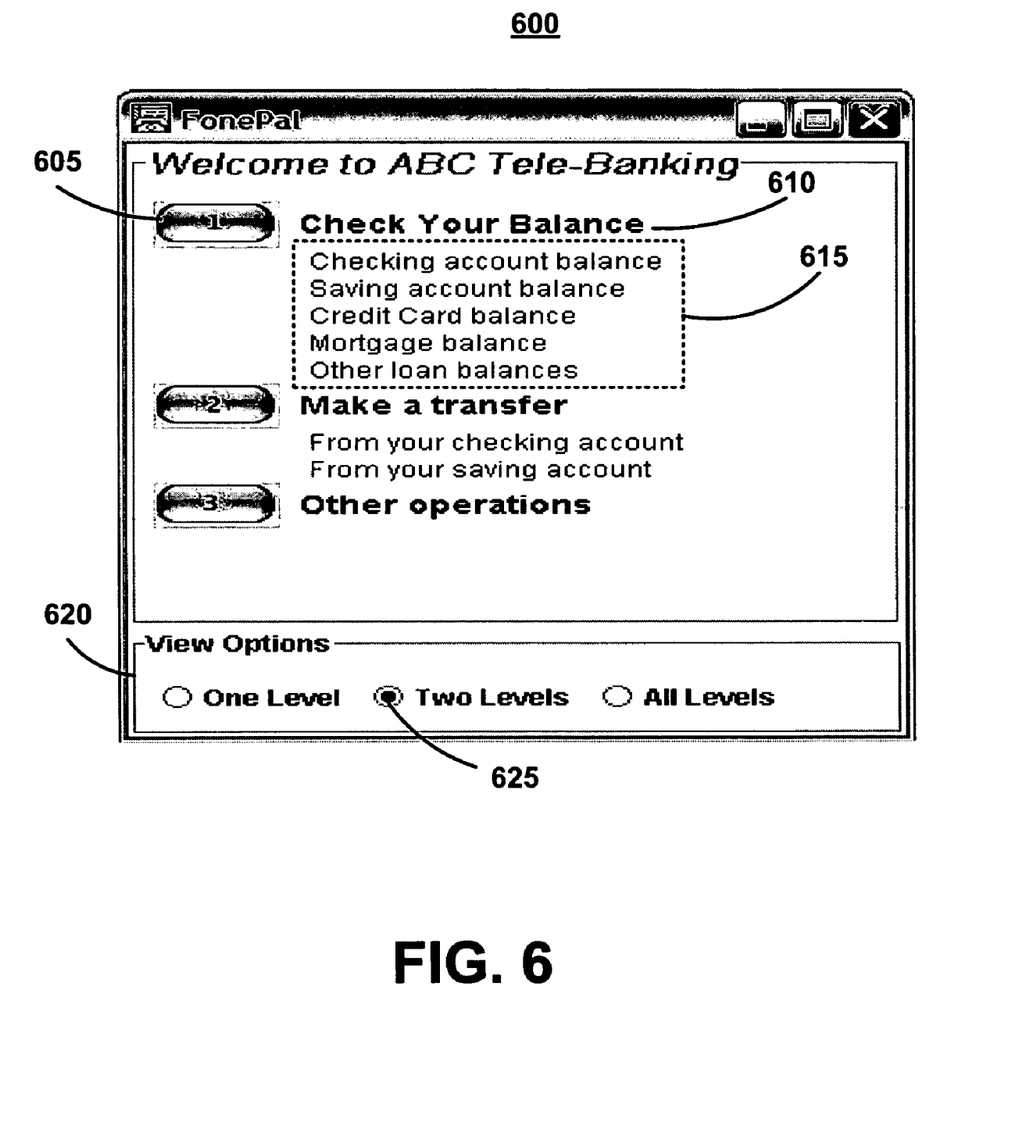
FIG. 6 is an exemplary screen shot of a visual menu provided to a graphical display by the interactive visual menu of FIGS. 1 and 2.

FIG. 6 shows an example screen shot 600 of a visual menu provided by system 10. Buttons such as a button 605 indicate one or more choices user 75 may select. The voice menu concurrently speaks these choices. Current level menu items are emphasized with a larger bold font, as indicated by a menu item 610. Submenus are shown in a smaller plain font, as indicated by a submenu item list 615. If user 75 selects a current menu item, system 10 updates the display shown in the screen shot 600. All submenu items of the selection become current menu items. System 10 provides display options to user 75. For example, the number of sublevels shown can be varied in a "View Options" panel 620. As shown in the screen shot 600, user 75 has selected a "two levels" view 625, showing the presently available menu options and a direct submenu item list for each of the presently available menu options.

It is to be understood that the specific embodiments of the invention that have been described are merely illustrative of certain applications of the principle of the present invention. Numerous modifications may be made to the system, method, and service for seamlessly integrating an interactive visual menu with an audio menu provided in an interactive voice response system described herein without departing from the spirit and scope of the present invention. Moreover, while the present invention is described for illustration purpose only in relation to instant messaging, it should be clear that the invention is applicable as well to, for example, any method that transmits a message to an interactive device. As an example, the present invention may be embodied in a service that uses a system that receives the visual menu content from a company's IVR, maps it to the user's virtual address, and then sends and updates the visual menu to the user's computer. This embodiment could be envisioned as an enhanced IM service (or messenger) or a special connection/routing service. These functions could be part of a company's IVR, and might require user to register his or her virtual address with one or more routing service companies or services.

What is claimed is:

1. A method of integrating a visual menu with an audio menu, comprising:
   receiving an audio call from a user;
   initiating an interactive session based on the received audio call;
   correlating the user with an accessible interactive device, including mapping a user identification of the user with a virtual location of the user, wherein the user identification comprises a combination of a phone number, an employee identification, and a customer identification;
   registering the user with multiple entities that utilize the visual menu and the audio menu;
   transmitting an instant message including an embedded hyperlink to the virtual location of the user, wherein the instant message comprises an instruction displayed on an interactive display device for receiving the visual menu;
   initiating the audio menu by an interactive voice response unit using an audio control module;
   executing the instruction to receive the visual menu;
   providing the visual menu to the user by displaying it within an instant messaging window;
   synchronizing the visual menu and the audio menu using time stamp and dual-tone multi-frequency input from the accessible interactive device; and
   updating the visual menu with the audio menu as the user selects a menu option presented by at least one of the visual menu or the audio menu.

2. The method of claim 1, wherein mapping the virtual location comprises mapping any one or more of a user's instant messaging address or an SIP address.

3. The method of claim 1, further comprising storing the virtual location and the user identifications in a mapping database.

4. The method of claim 1, wherein the audio menu comprises a telephone menu.

5. The method of claim 1, wherein transmitting the instant message to the virtual location of the user comprises transmitting the instant message over a network.

6. The method of claim 1, wherein the instant message comprises a session identifier that uniquely represents the interactive session; and
   concurrently synchronizing the visual menu with the audio menu using the session identifier.

7. The method of claim 1, wherein the instruction comprises any one of: an IP address and a port number, or a URL of an interactive visual menu service from which the visual menu is transmitted.

8. The method of claim 1, wherein performing the instruction comprises any one of: following a link to the in instant message, or open a connection with the IP address and port number for the in session initialization message.

9. The method of claim 1, wherein synchronizing the visual menu with the audio menu comprises using time stamp and user input.

10. The method of claim 9, comprising inputting the user input by any one or more of:
    pressing a keypad of a telephone to generate dual-tone multi-frequency input;
    speaking a command into a telephone microphone;
    pressing a key on a keyboard associated with the interactive device;
    clicking on a mouse associated with the interactive device;
    using a virtual keyboard; and
    using a touch screen with the interactive device.

11. The method of claim 1, wherein executing the instruction to receive the visual menu comprises using any one or more of:
    an instant messaging client on the interactive device;
    a web browser on the interactive device;
    a SIP user agent;
    a customized client on the interactive device; and
    a graphical display.

12. The method of claim 1, wherein the visual menu comprises any one or more of:
    menu options at a current level of a hierarchical menu tree corresponding to the audio menu;
    menu options at additional levels of the hierarchical menu tree;
    additional information to augment the audio menu;
    links to additional information to augment the audio menu.

13. The method of claim 12, wherein the additional information comprises any one or more of: a frequently asked questions web page, shortcuts of recent selections, and text or image resources.

14. The method of claim 1, further comprising dynamically changing the visual menu with an input from the user.

15. A computer program product comprising a plurality of executable instruction codes stored on a computer-readable medium, for integrating a visual menu with an audio menu, the computer program product comprising:
    instruction codes for identifying an incoming telephone call;
    instruction codes for initiating an interactive session in response to the identified telephone call;
    instruction codes for correlating the user with an accessible interactive device, including mapping a user identification of a user with a virtual location of the user;
    instruction codes for registering the user with multiple entities that utilize the visual menu and the audio menu;
    instruction codes for transmitting a session initialization message including an embedded hyperlink to the virtual location of the user, wherein the session initialization message comprises an instruction for receiving the visual menu and wherein activation of the hyperlink by the user opens the visual menu;
    instruction codes for initiating the audio menu by an interactive voice response unit using an audio control module;
    instruction codes for executing the instruction to receive the visual menu;

instruction codes for providing the visual menu to the user;

instruction codes for synchronizing the visual menu and the audio menu using time stamp and dual-tone multi-frequency input from the accessible interactive device; and instruction codes for concurrently synchronizing the visual menu with the audio menu as the user selects a menu option presented by at least one of the visual menu or the audio menu;

instruction codes for transmitting a Uniform Resource Locator (URL) of a web browser that displays the visual menu to the accessible interactive device through an instant messaging service; and instruction codes for ending the visual menu during the time the user is connected to another user.

16. The computer program product of claim 15, wherein the instruction codes map the virtual location of the user by mapping any one or more of a user's instant messaging address or an SIP address.

17. The computer program product of claim 15, further comprising a mapping data store for storing the virtual location and the user identifications.

18. A system for integrating a visual menu with an audio menu, comprising:

an identification registration module for creating and storing a mapping of a user identification with a virtual location of the user;

a session initialization module for correlating the user with an accessible interactive device, including mapping the user identification of a user with the virtual location of the user;

the session initialization module mapping the virtual location of the user to multiple identifications of the user;

the session initialization module transmitting a session initialization message to the virtual location of the user upon receipt of a telephone call by the user, wherein the session initialization message comprises an instruction message including an embedded hyperlink directing the user to an interactive browser including the visual menu, by displaying the visual menu within an instant messaging window;

an interactive voice response unit using an audio control module for initiating the audio menu;

a menu display for executing the instruction to receive the visual menu;

a visual control module for providing the visual menu to the user;

an audio-visual synchronization module for concurrently synchronizing the visual menu with the audio menu as the user selects a menu option presented by at least one of the visual menu or the audio menu wherein the visual menu and the audio menu are synchronized using time stamp and dual-tone multi-frequency input from the telephone.

19. The system of claim 18, wherein the session initialization module maps the virtual location of the user by mapping any one or more of a user's instant messaging address or an SIP address.

20. A service for integrating a visual menu with an audio menu during an interactive session, comprising:

receiving a telephone call from a user;

automatically correlating the user with an accessible interactive device, including mapping a user identification of the user with a virtual location of the user, to correlate the user with an accessible interactive device wherein the user identification comprises a combination of a phone number, an employee identification, and a customer identification;

mapping the virtual location of the user to multiple identifications of the user;

initiating the audio menu by an interactive voice response unit using an audio control module;

automatically transmitting an instant text message to the virtual location of the user upon receiving the telephone call, wherein the instant text message comprises an instruction for initiating an instant messaging client that is interactive through the visual menu;

transmitting a Uniform Resource Locator (URL) of a web browser that displays the visual menu to the accessible interactive device through an instant messaging service;

automatically executing the instruction to receive the visual menu;

providing the visual menu to the user; and updating the visual menu with the audio menu as the user selects a menu option presented by at least one of the visual menu or the audio menu wherein the visual menu and the audio menu are synchronized using time stamp and dual-tone multi-frequency input from the telephone.

* * * * *